(12) United States Patent
Pydin

(10) Patent No.: US 11,011,959 B2
(45) Date of Patent: May 18, 2021

(54) VEHICLE DRIVING APPARATUS AND MANUFACTURING METHOD THEREOF

(71) Applicant: Honda Motor Co., Ltd., Tokyo (JP)

(72) Inventor: Andrii Pydin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 450 days.

(21) Appl. No.: 16/039,068

(22) Filed: Jul. 18, 2018

(65) Prior Publication Data

US 2019/0044411 A1 Feb. 7, 2019

(30) Foreign Application Priority Data

Aug. 2, 2017 (JP) .............................. JP2017-150120

(51) Int. Cl.
| | |
|---|---|
| *F16H 57/038* | (2012.01) |
| *B60K 1/04* | (2019.01) |
| *B60K 1/00* | (2006.01) |
| *H02K 7/00* | (2006.01) |
| *H02K 7/116* | (2006.01) |

(52) U.S. Cl.
CPC ................ *H02K 7/116* (2013.01); *B60K 1/00* (2013.01); *B60K 1/04* (2013.01); *F16H 57/038* (2013.01); *H02K 7/006* (2013.01); *H02K 7/1166* (2013.01); *B60K 2001/001* (2013.01); *B60K 2001/0422* (2013.01); *B60Y 2400/73* (2013.01); *B60Y 2410/10* (2013.01); *B60Y 2410/102* (2013.01)

(58) Field of Classification Search
CPC ...... H02K 7/116; H02K 7/1166; H02K 7/006; H02K 5/04; B60K 1/00; B60K 1/04; B60K 2001/0422; B60K 2001/001; F16H 57/038; B60Y 2400/73; B60Y 2410/102; B60Y 2410/10

USPC .......................................................... 310/83
See application file for complete search history.

(56) References Cited

U.S. PATENT DOCUMENTS

| | | | | |
|---|---|---|---|---|
| 2,306,958 | A | * | 12/1942 | Kurti ..................... B60K 17/303 74/386 |
| 3,833,322 | A | * | 9/1974 | Fletcher .................. B29C 71/02 425/28.1 |

(Continued)

FOREIGN PATENT DOCUMENTS

JP 2012029369 A 2/2012

OTHER PUBLICATIONS

Machine Translation of JP2012029369A Abstract (Year: 2012).*

(Continued)

*Primary Examiner* — James A Shriver, II
*Assistant Examiner* — Michael T. Walsh
(74) *Attorney, Agent, or Firm* — Duft & Bornsen, PC

(57) ABSTRACT

A vehicle driving apparatus including, a first shaft provided at a center portion of a rotor and having a first bevel gear projected from an top surface of the rotor, a second bevel gear engaged with the first bevel gear and having an inner peripheral surface fitted to an outer peripheral surface of a second shaft extended in a horizontal direction, and a case having a first case forming a first housing space to accommodate the first shaft and the first bevel gear and a second case forming a second housing space to accommodate the second shaft and the second bevel gear. The second case has an opening at an upper surface thereof for inserting the second bevel gear and a cover to close the opening.

10 Claims, 15 Drawing Sheets

(56) References Cited

U.S. PATENT DOCUMENTS

| | | | | |
|---|---|---|---|---|
| 4,842,326 | A * | 6/1989 | DiVito | B60P 3/42 |
| | | | | 296/10 |
| 7,047,713 | B2 * | 5/2006 | van Wouw | A01D 34/76 |
| | | | | 56/10.8 |
| 2003/0147709 | A1 * | 8/2003 | Hara | B25F 5/021 |
| | | | | 408/16 |
| 2011/0259657 | A1 * | 10/2011 | Fuechtner | B60K 7/0007 |
| | | | | 180/65.21 |
| 2012/0325030 | A1 * | 12/2012 | Kinsey | B60K 17/34 |
| | | | | 74/15.82 |
| 2016/0341297 | A1 * | 11/2016 | Iwaki | F16H 57/038 |
| 2017/0072532 | A1 * | 3/2017 | Kawakami | B24B 55/052 |

OTHER PUBLICATIONS

Machine Translation of JP2012029369A Specification (Year: 2012).*
Machine Translation of JP2012029369A Drawings (Year: 2012).*
Machine Translation of JP2012029369A Claims (Year: 2012).*

* cited by examiner

LEFT ←——→ RIGHT

VEHICLE DRIVING APPARATUS AND MANUFACTURING METHOD THEREOF

CROSS-REFERENCE TO RELATED APPLICATION

This application is based upon and claims the benefit of priority from Japanese Patent Application No. 2017-150120 filed on Aug. 2, 2017, the content of which is incorporated herein by reference.

BACKGROUND OF THE INVENTION

Field of the Invention

This invention relates to a vehicle driving apparatus including a dynamoelectric machine and a manufacturing method of the vehicle driving apparatus.

Description of the Related Art

Conventionally, there is a known vehicle driving apparatus of this type, in which an electric motor is installed under a vehicle seat in a state with an axis of rotation of the motor oriented in vehicle height direction and torque of the motor is transmitted to a horizontally extending shaft through a pair of bevel gears. Such an apparatus is described in Japanese Unexamined Patent Publication No. 2012-029369 (JP2012-029369A), for example. In the apparatus described in JP2012-029369A, a bevel gear is provided on an upper end portion of a shaft fitted on a center part of a rotor of the motor to project above an upper end of a casing.

The vehicle driving apparatus is sometimes installed at about the same height as drive wheels at a location under the vehicle seat, for example, as described in JP2012-029369A. Therefore, in a vehicle driving apparatus whose motor is installed with its axis of rotation directed in vehicle height direction, the height of the apparatus is preferably kept as low as possible. However, the invention described in JP2012-029369A proposes nothing regarding this point.

SUMMARY OF THE INVENTION

An aspect of the present invention is a vehicle driving apparatus including a dynamoelectric machine including a rotor rotatable about a first axial line in a vertical direction and a stator provided so as to surround the rotor; a first shaft provided at a center portion of the rotor to rotate integrally with the rotor and including a first bevel gear at an upper end portion of the first shaft projected from top surface of the rotor; a second shaft extended along a second axial line in a horizontal direction; a second bevel gear engaged with the first bevel gear and including an inner peripheral surface fitted to an outer peripheral surface of the second shaft to rotate integrally with the second shaft; and a case including a first case to form a first housing space so as to accommodate the rotor, the stator, the first shaft and the first bevel gear and a second case to form a second housing space so as to accommodate the second shaft and the second bevel gear. The second case is provided at an upper end portion of the first case, and includes an opening at an upper surface thereof through which the second bevel gear is inserted into the second housing space and a cover to close the opening.

Another aspect of the present invention is a manufacturing method of a vehicle driving apparatus. The vehicle driving apparatus includes: a dynamoelectric machine including a rotor rotatable about a first axial line in a vertical direction and a stator provided so as to surround the rotor; a first shaft provided to rotate integrally with the rotor and including a first bevel gear at an upper end portion of the first shaft projected from top surface of the rotor; a second shaft extended along a second axial line in a horizontal direction; a second bevel gear engaged with the first bevel gear and including an inner peripheral surface fitted to an outer peripheral surface of the second shaft to rotate integrally with the second shaft; and a case including a first case to form a first housing space so as to accommodate the rotor, the stator, the first shaft and the first bevel gear and a second case to form a second housing space so as to accommodate the second shaft and the second bevel gear, wherein the second case is provided at an upper end portion of the first case. The manufacturing method includes: inserting the second bevel gear into the second housing space through an opening at an upper surface of the second case so as to engage with the first bevel gear accommodated in the first housing space; inserting the second shaft along the second axial line into the second housing space so as to fit within an inner peripheral surface of the second bevel gear; and closing the opening with a cover.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
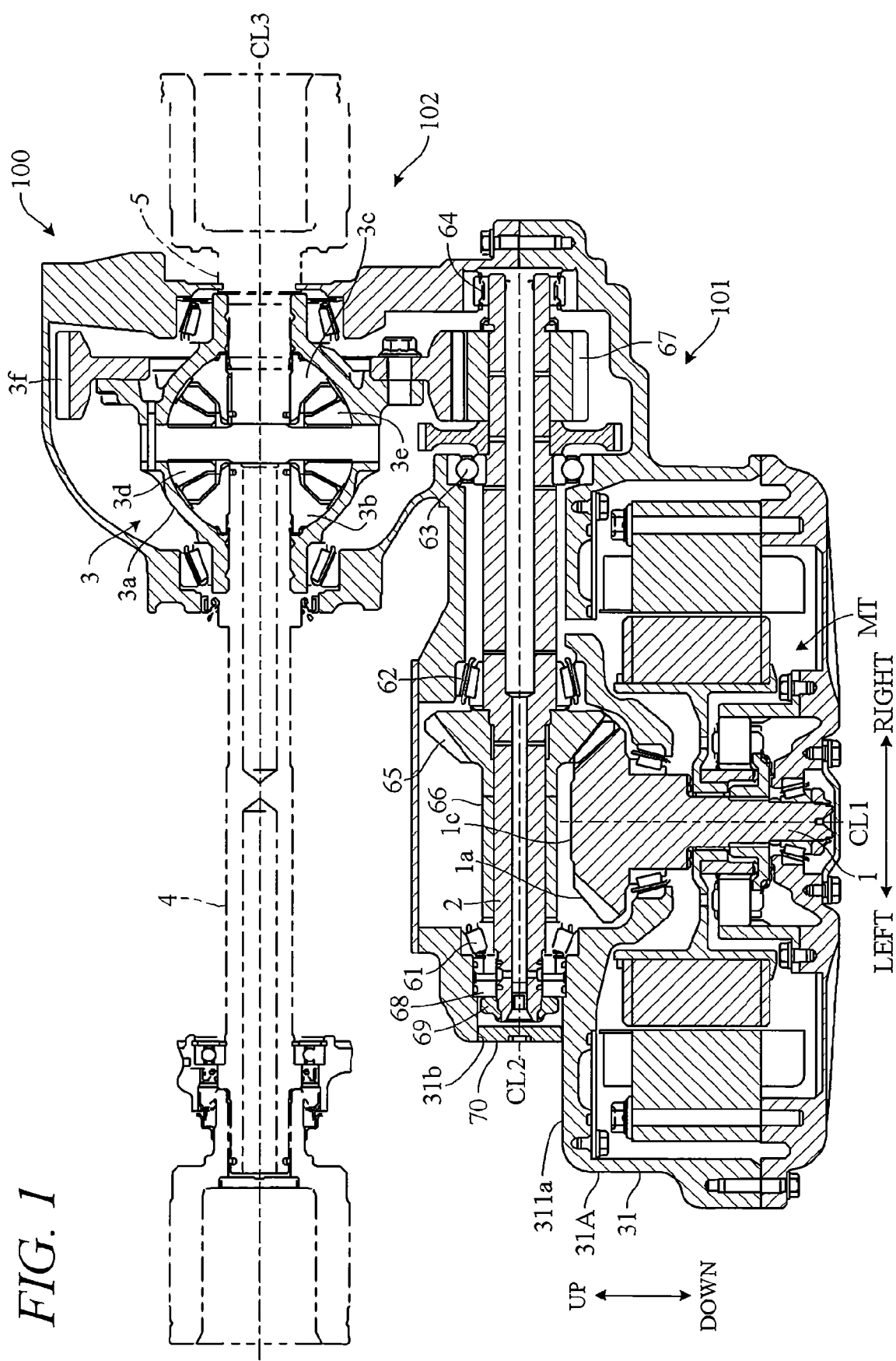
FIG. 1 is a cross-sectional diagram showing a developed view of main components of a vehicle driving apparatus according to an embodiment of the present invention.

Hereinafter, an embodiment of the present invention is explained with reference to FIGS. 1 to 15. FIG. 1 is a cross-sectional diagram showing a developed view of main components of a vehicle driving apparatus 100 according to the embodiment of the present invention. The vehicle driving apparatus 100 is configured to output driving torque for driving wheels of a vehicle and includes an electric motor MT as an example of a dynamoelectric machine. The vehicle driving apparatus 100 is mounted on an electric vehicle, hybrid vehicle or other vehicle having an electric motor as a drive (propulsion) power source. In FIG. 1, vehicle vertical (height) direction, i.e., up-down direction and lateral (width) direction, i.e., left-right direction are indicated by arrows.

As shown in FIG. 1, the vehicle driving apparatus 100 includes a first drive unit 101 for converting and outputting torque of the motor MT as torque centered on a lateral axis CL2 and a second drive unit 102 for converting and outputting torque output from the first drive unit 101 as torque centered on a lateral axis CL3. The motor MT is also used as a generator. Although the second drive unit 102 appears above the first drive unit 101 in the developed view of FIG. 1, the second drive unit 102 is actually situated forward or rearward of the first drive unit 101, and axis CL3 is located below axis CL2 (see FIGS. 4A and 4B).

As shown in FIG. 1, the vehicle driving apparatus includes the motor MT, a first shaft 1 rotatably supported centered on a vertical axis CL1 extending in up-down direction inside the motor MT, a second shaft 2 rotatably supported centered on the axis CL2 orthogonal to the axis CL1, and a differential 3 rotatably supported centered on the axis CL3 parallel to the axis CL2. Torque from the motor MT is transmitted through the first shaft 1, second shaft 2 and differential 3 to left and right driveshafts 4 and 5, whereby left and right drive wheels are driven.

Figure 2:
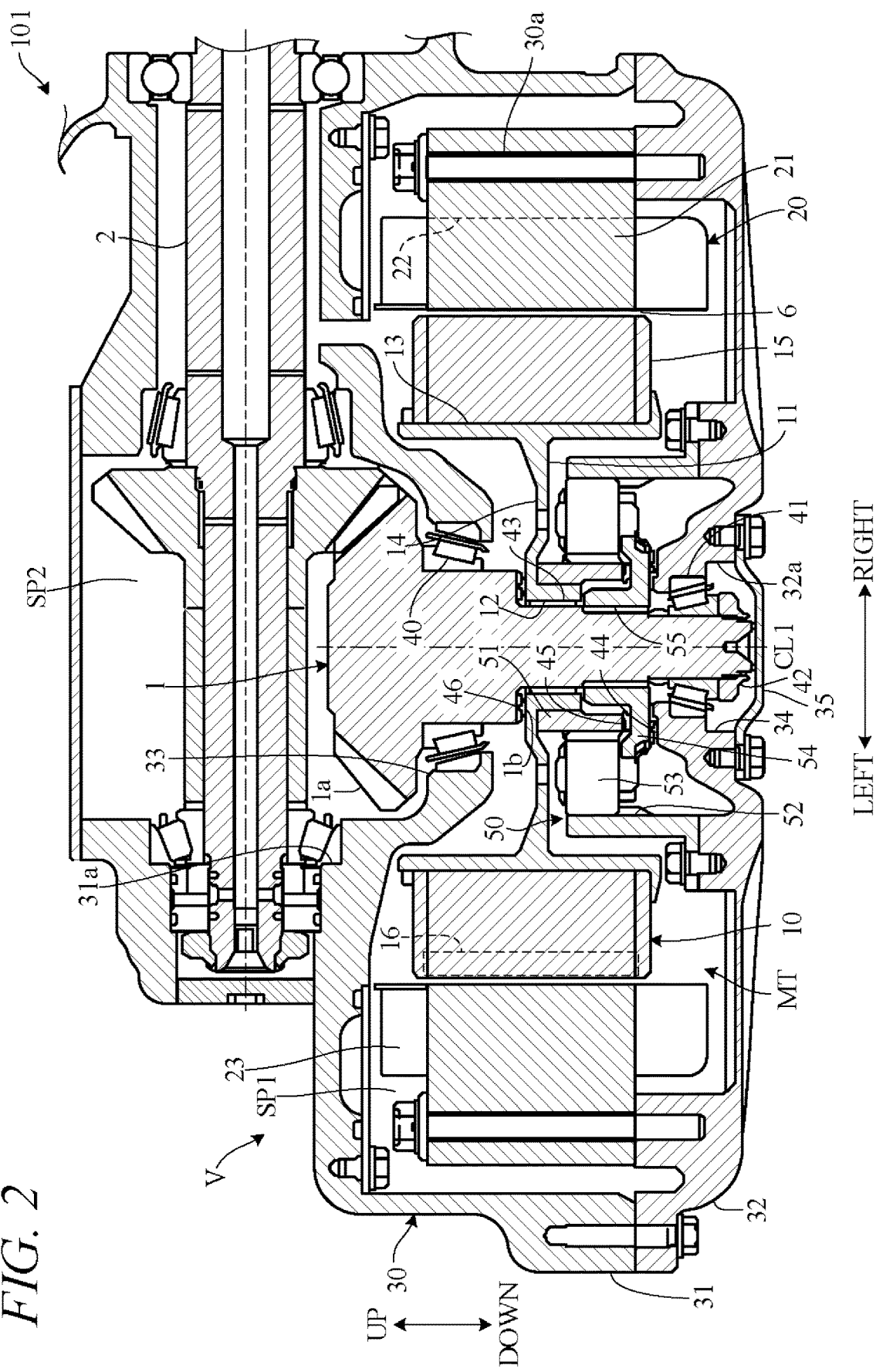
FIG. 2 is an enlarged view of a main part of the vehicle driving apparatus of FIG. 1.

FIG. 2 is an enlarged view of a main part of the first drive unit 101 of FIG. 1. As shown in FIG. 2, the motor MT includes a rotor 10 which rotates centered on the axis CL1 and a stator 20 located around the rotor 10. The rotor 10 and stator 20 are accommodated in a first housing space SP1 inside a case 30.

The rotor 10 includes a rotor hub 11 and a rotor core 15. The rotor hub 11 includes a substantially cylinder-shaped shaft 12 centered on the axis CL1, a cylindrical member 13 of larger diameter than and coaxial with the shaft 12, and a substantially disk-shaped plate 14 which extends radially to connect the shaft 12 and cylindrical member 13. The rotor core 15 is a substantially cylinder-shaped rotor iron core centered on the axis CL1. The rotor core 15 is fitted on and fastened to an outer peripheral surface of the cylindrical member 13 of the rotor hub 11 so as to rotate integrally with the rotor hub 11. The motor MT is an interior permanent magnet synchronous motor, and multiple circumferentially spaced permanent magnets 16 are embedded in the rotor core 15. Alternatively, it is possible instead to use as the motor MT one having no magnets 16, such as a synchronous reluctance motor or switched reluctance motor.

The stator 20 has a substantially cylinder-shaped stator core 21 which is centered on the axis CL1 and disposed across a gap 6 of predetermined radial length from an outer peripheral surface of the rotor core 15. The stator core 21 is a fixed iron core whose inner peripheral surface is formed with multiple circumferentially spaced radially outward directed slots 22. A winding 23 (coil) is formed in the slots 22 as a concentrated winding or distributed winding. Upper and lower ends of the winding 23 protrude upward and downward of upper and lower ends of the stator core 21. The rotor 10 rotates when a revolving magnetic field is generated by passing three-phase alternating current through the winding 23.

The case 30 includes vertically disassemblable upper and lower cases members 31 and 32. The stator core 21 is fastened to the lower case 32 by through-bolts 30a. An opening 31a centered on the axis CL1 is formed at a center portion of the upper case 31, and an opening 32a centered on the axis CL1 is formed at a center portion of the lower case 32. A shaft support 33 is formed in the opening 31a of the upper case 31 to extend downward and radially inward. A shaft support 34 is formed in the opening 32a of the lower case 32 to extend upward and radially inward.

An outer peripheral surface of the first shaft 1 is rotatably supported on these shaft supports 33 and 34 via tapered roller bearings 40 and 41, respectively. A nut 42 fastened to a lower end portion of the first shaft 1 restrains the first shaft 1 in vertical direction. A cover 35 is attached to a bottom surface of the lower case 32 so as to close the opening 32a from outside. An inner peripheral surface of the shaft 12 of the rotor hub 11 is relatively rotatably supported on the outer peripheral surface of the first shaft 1 via a needle bearing 43.

A planetary gear mechanism 50 is interposed in a torque transmission path between the rotor 10 and the first shaft 1. The planetary gear mechanism 50 includes a sun gear 51 and a ring gear 52, both of substantially cylinder shape centered on the axis CL1, multiple circumferentially spaced planetary gears 53 disposed between the sun gear 51 and the ring gear 52, and a substantially cylinder shaped carrier 54 which is centered on the axis CL1 and rotatably supports the planetary gears 53. A needle bearing 44 is interposed between a top surface of the shaft support 34 and a bottom surface of the carrier 54, whereby the carrier 54 is relatively rotatably supported with respect to the shaft support 34. A needle bearing 45 is interposed between a top surface of the carrier 54 and a bottom surface of the sun gear 51, whereby the sun gear 51 is relatively rotatably supported with respect to the carrier 54.

An inner peripheral surface of the sun gear 51 is spline-fitted on an outer peripheral surface of the shaft 12 of the rotor hub 11, whereby rotation of the rotor 10 is transmitted to the sun gear 51. The ring gear 52 is fixed to an upper surface of the lower case 32. The planetary gears 53 are engaged with the sun gear 51 and the ring gear 52, whereby rotation of the sun gear 51 is transmitted through the planetary gears 53 to the carrier 54. The carrier 54 has a substantially cylinder-shaped shaft 55 centered on the axis CL1. The shaft 55 is of smaller diameter than the sun gear 51, and an inner peripheral surface of the shaft 55 is spline-fitted on the outer peripheral surface of the first shaft 1 below the needle bearing 43 and above the tapered roller bearing 41, whereby rotation of the carrier 54 is transmitted to the first shaft 1.

A bevel gear 1a of larger diameter than the tapered roller bearing 40 is formed on an upper end portion of the first shaft 1 above the tapered roller bearing 40. A step 1b is provided on the outer peripheral surface of the first shaft 1, whereby diameter of the outer peripheral surface is reduced below the step 1b. A needle bearing 46 is interposed between a top surface of the plate 14 of the rotor hub 11 and a bottom surface of the step 1b, whereby the first shaft 1 is relatively rotatably supported with respect to the rotor hub 11. In the upper case 31, a second housing space SP2 is formed above a first housing space SP1.

As shown in FIG. 1, in the second housing SP2, the second shaft 2 is rotatably supported on the upper case 31 by a pair of left and right tapered roller bearings 61 and 62 installed diagonally left-upward and diagonally right-upward of the bevel gear 1a of the first shaft 1 and by a ball bearing 63 and a roller bearing 64 installed rightward of the tapered roller bearing 62.

The second shaft 2 is inserted along inner peripheral surfaces of a bevel gear 65 and a spacer 66, both of substantially cylinder-shape centered on the axis CL2, which are installed between the left and right tapered roller bearings 61 and 62. At the time of the insertion, the inner peripheral surface of the bevel gear 65 is spline-fitted on an outer peripheral surface of the second shaft 2, whereby the second shaft 2 rotates integrally with the bevel gear 65. Rotation of the first shaft 1 is therefore transmitted through the bevel gears 1a and 65 to the second shaft 2. A spur gear 67 is spline-fitted on the outer peripheral surface of the second shaft 2 between the ball bearing 63 and roller bearing 64, whereby the spur gear 67 rotates integrally with the second shaft 2.

Further, on the left side of the tapered roller bearing 61, an oil guide 68 is fitted on the outer peripheral surface of the second shaft 2. A nut 69 is fastened to the left end portion of the second shaft 2 to restrict the second shaft 2 in the axial direction. At the left end portion of the upper case 31 (a second upper case 31B described later), an opening 31b is formed facing the nut 69. To the left end portion of the upper case 31, a cap 70 is attached to close the opening 31b.

The differential 3 includes a differential case 3a and multiple gears housed in the differential case 3a, i.e., a pair of left and right side gears 3b and 3c respectively attached to the pair of left and right drive shafts 4 and 5, and a pair of pinion gears 3d and 3e which engage the side gears 3b and 3c. An input gear 3f fixed on the differential case 3a engages the spur gear 67 fastened to the second shaft 2, whereby torque of the second shaft 2 is transmitted through the spur gear 67 and input gear 3f to the differential case 3a. Therefore, the differential case 3a rotates around the axis CL3, and the drive shafts 4 and 5 are driven.

Figure 3:
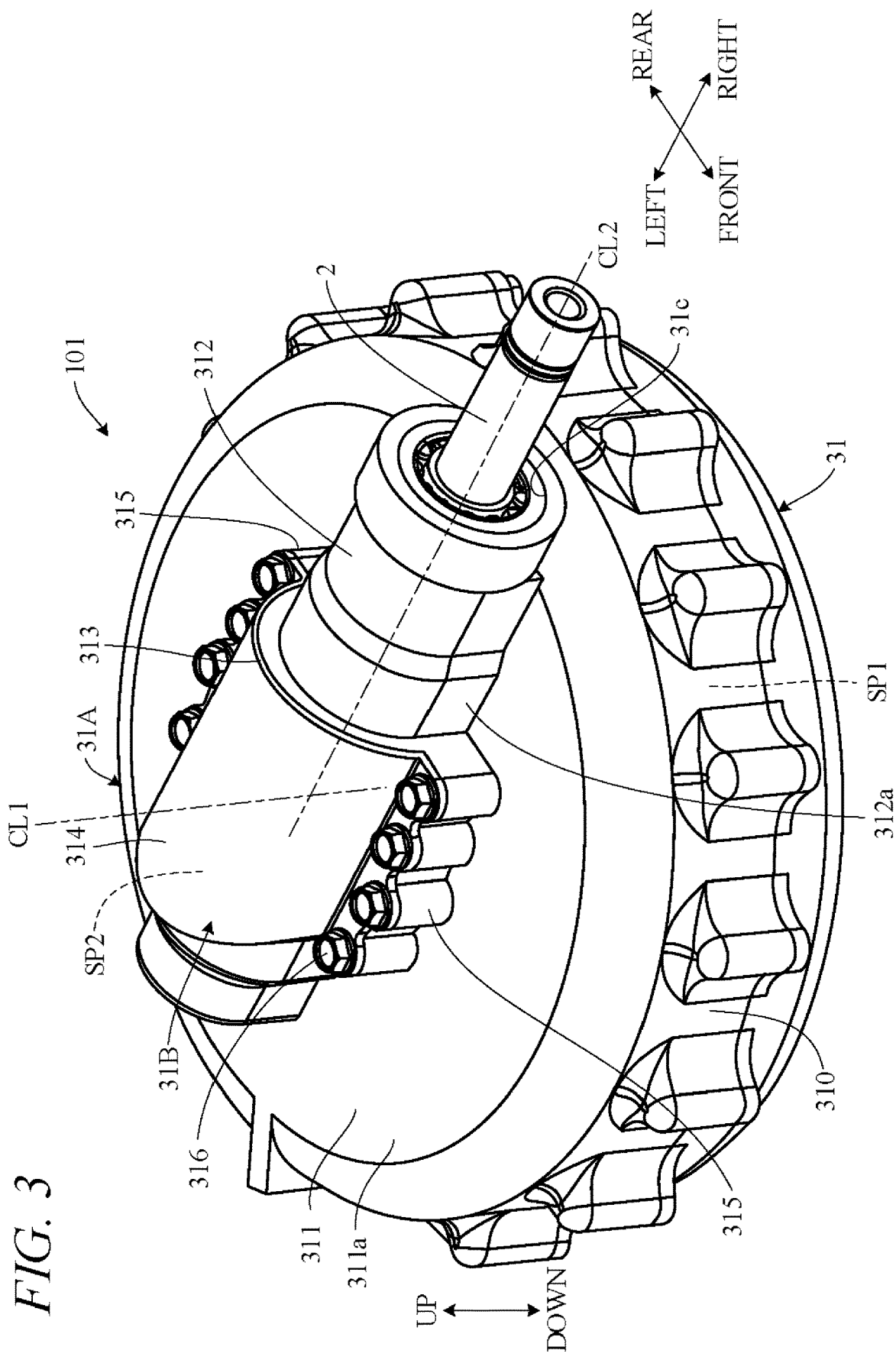
FIG. 3 is a perspective diagram showing part of the vehicle driving apparatus as viewed obliquely from above.

Characteristic configurations of the present embodiment will be explained in more detail. FIG. 3 is a perspective diagram showing part of the first drive unit 101 as viewed obliquely from above. Illustration of the interior of the lower case 32 is omitted in FIG. 3. As shown in FIG. 3, the upper case 31 integrally includes a first upper case 31A which forms the first housing space SP1 (FIG. 2) in cooperation with the lower case 32 and a second upper case 31B provided on top of the first upper case 31A to form the second housing space SP2 (FIG. 2).

The first upper case 31A includes a substantially cylinder-shaped side wall 310 centered on the vertical axis CL1 and a top wall 311 which covers an upper surface of the side wall 310. The second upper case 31B has a swelling portion 312, of roughly cylinder shape centered on the axis CL2 which extends laterally, formed on a top surface 311a of the top wall 311. Wall surfaces 312a of the swelling portion 312 downward of the axis CL2 stand vertically from the top wall 311 in order to form the swelling portion 312 to swell upward from the top wall 311. Therefore, the swelling portion 312 is not strictly cylinder shaped but better described as roughly cylinder shaped or semicylinder shaped.

Diameter of the swelling portion 312 is smaller than that of the side wall 310, and the top surface 311a of the top wall 311 is formed horizontally flat at forward and rearward ends of the swelling portion 312, as well as elsewhere. As shown in FIG. 1, a top surface 1c of the first bevel gear 1a is located below the top surface 311a of the first upper case 31A. The first bevel gear 1a and the second bevel gear 65 engage below the top surface 311a.

As shown in FIG. 3, an upper surface of the second upper case 31B is provided with a semicylinder-shaped opening 313 centered on the axis CL2 (see FIG. 5), and the axis CL1 passes through the lateral center of the opening 313. The opening 313 is covered by a cover 314 which is a semicylinder-shaped plate. The opening 313 is rectangular in plan view, and the cover 314 is fastened by bolts 316 to mounting bases 315 provided forward and rearward of the opening 313. An opening 31c is provided along the axis CL2 at a right end portion of the second upper case 31B, and a right end portion of the second shaft 2 projects from the opening 31c.

Thus in the present embodiment, the vehicle driving apparatus 100 is configured with the axis of rotation CL1 of the motor MT oriented in vehicle height direction, whereby overall height of the vehicle driving apparatus can be reduced as compared with a vehicle driving apparatus whose axis of rotation CL1 is oriented horizontally. In particular, since the first bevel gear 1a and the second bevel gear 65 are engaged below the upper surface 311a of the first upper case 31A, it is possible to suppress minimally a projection length upward of the second upper case 31B. Therefore, a large diameter motor required for developing high output can be easily installed in a height-restricted space of a vehicle.

Figure 4A:
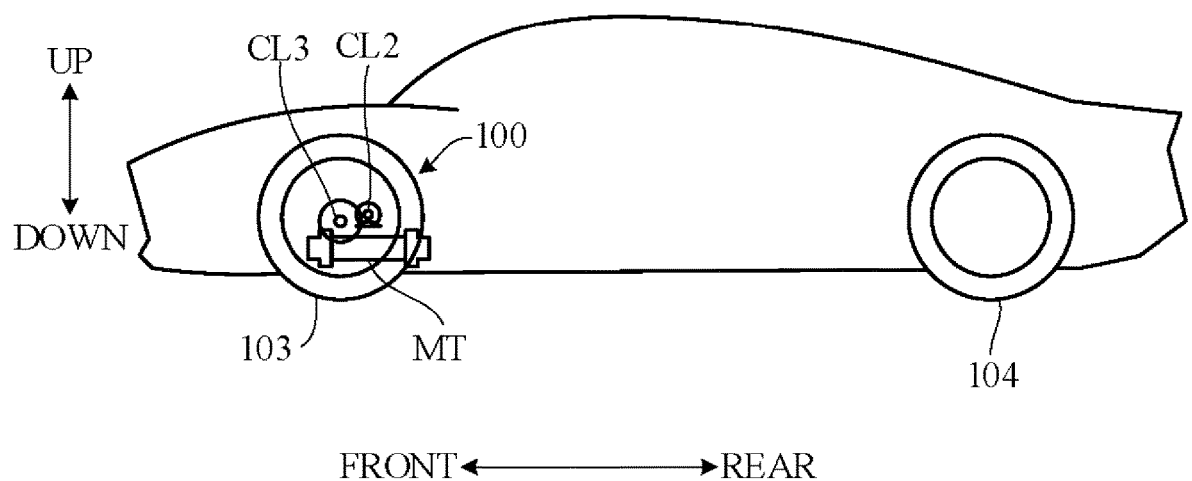
FIG. 4A is a side view showing an example of installation of the vehicle driving apparatus of FIG. 1 in the vehicle.
Figure 4B:
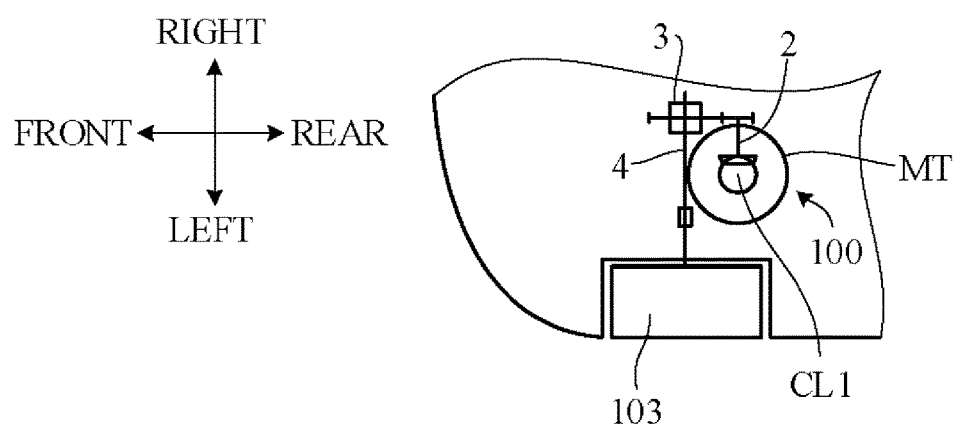
FIG. 4B is a plan view showing an example of installation of the vehicle driving apparatus of FIG. 1 in the vehicle.

FIGS. 4A and 4B are respectively a side view and plan view showing an example of installation of the vehicle driving apparatus 100 in the vehicle. In FIGS. 4A and 4B, the vehicle driving apparatus 100 is installed between left and right front wheels 103 for use as a front wheel drive unit. The vehicle driving apparatus 100 can be also installed between left and right rear wheels 104 for use as a rear wheel drive unit.

As shown in FIGS. 4A and 4B, the motor MT is installed below and behind the rotation axis (axis CL3) of the front wheels 103. Therefore, height of the vehicle hood can be lowered. Further, although not illustrated in the drawings, the vehicle driving apparatus 100 can be also easily installed below the vehicle seat or between the left and right rear wheels 104, without raising the floor surface inside the vehicle, and has a high flexibility in the arrangement.

Figure 5:
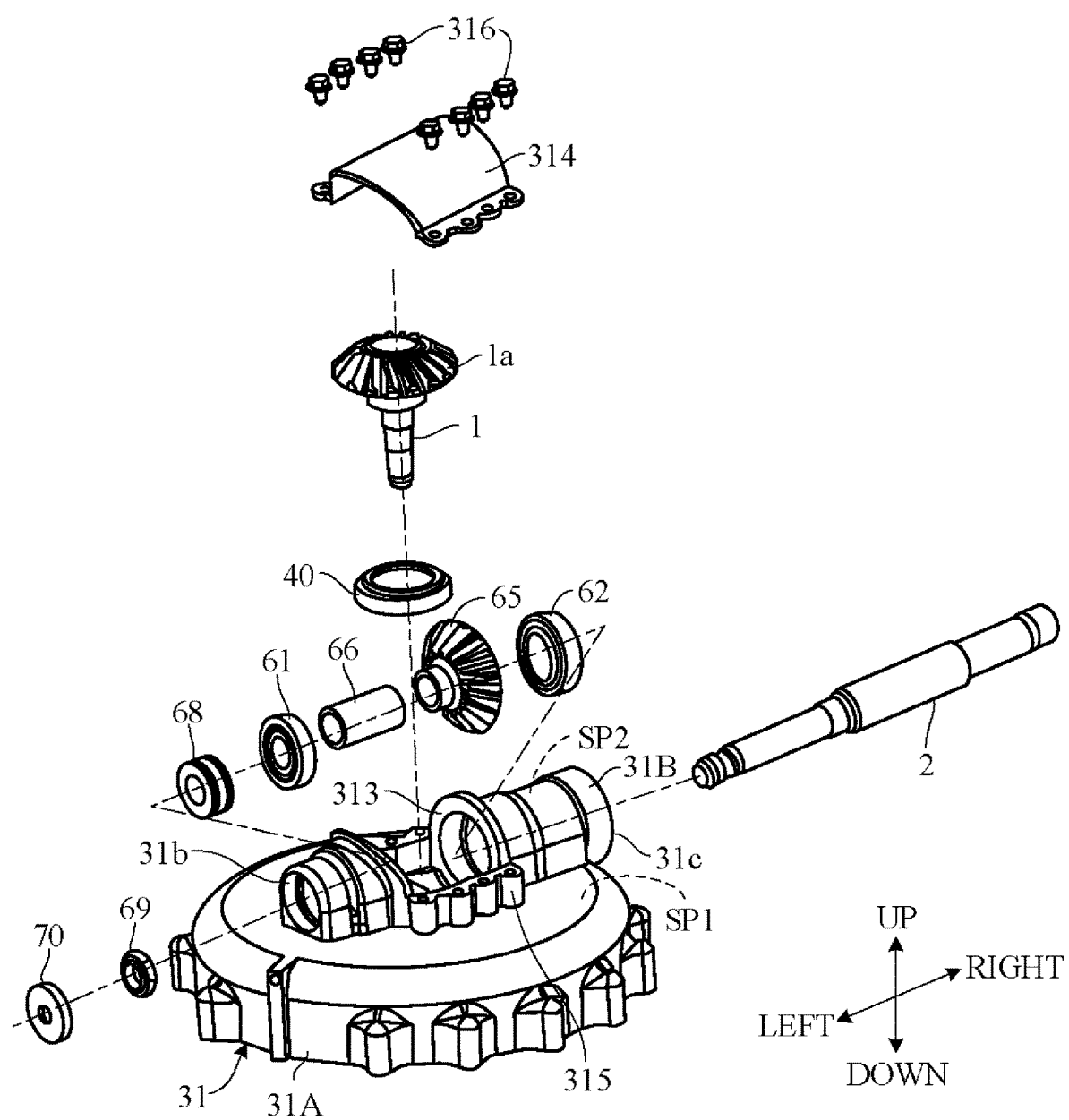
FIG. 5 is an exploded perspective view of some components of the vehicle driving apparatus according to the embodiment of the invention, incorporated into an upper case.
Figure 6:
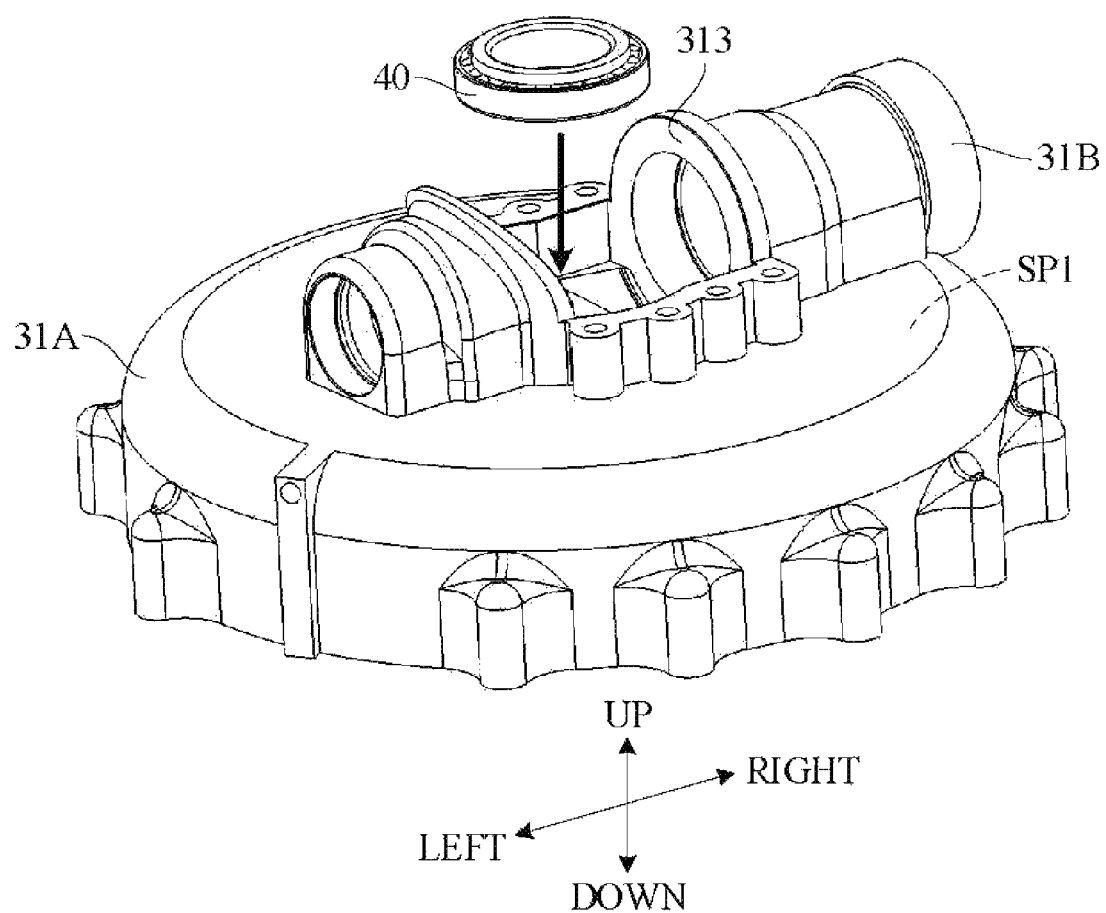
FIG. 6 is a perspective view showing main part for explaining steps of a manufacturing method of a vehicle driving apparatus according to the embodiment of the invention.

A manufacturing method of the vehicle driving apparatus 100 according to an embodiment of the present invention is explained next. FIG. 5 is an exploded perspective view of components of the vehicle driving apparatus 100 incorporated into the upper case 31. As shown in FIG. 5, the tapered roller bearing 40 and first shaft 1 are inserted from above through the opening 313 into the first housing space SP1 of the first upper case 31A. Next, the oil guide 68, tapered roller bearing 61, spacer 66, bevel gear 65 and tapered roller bearing 62 are inserted through the opening 313 into the second housing space SP2 of the second upper case 31B.

In addition, the second shaft 2 is inserted into the second housing space SP2 through the right-end opening 31c of the second upper case 31B. The second shaft 2 passes through the tapered roller bearing 62, second bevel gear 65, spacer 66, tapered roller bearing 61 and oil guide 68, and the nut 69 is fastened to the left end portion of the second shaft 2 via the left end opening 31b of the second upper case 31B, whereafter the cap 70 is attached to a left end portion of the second upper case 31B so as to close the opening 31b. In addition, the cover 314 is attached to the mounting bases 315 of the second upper case 31B by the bolts 316 so as to close the opening 313.

The above manufacturing method is explained in detail with reference to FIGS. 6 to 14 in the following. Illustration of the lower case 32 is omitted in FIGS. 6 to 14. First, with the motor MT and the planetary gear mechanism 50 accommodated beforehand in the first housing space SP1 between the upper case 31 (first upper case 31A) and the lower case 32, the tapered roller bearing 40 is inserted from above through the opening 313 of the upper surface of the second upper case 31B into the first housing space SP1, as indicated by an arrow in FIG. 6. This tapered roller bearing 40 is fitted in the shaft support 33 of the first upper case 31A (FIG. 2).

Figure 7:
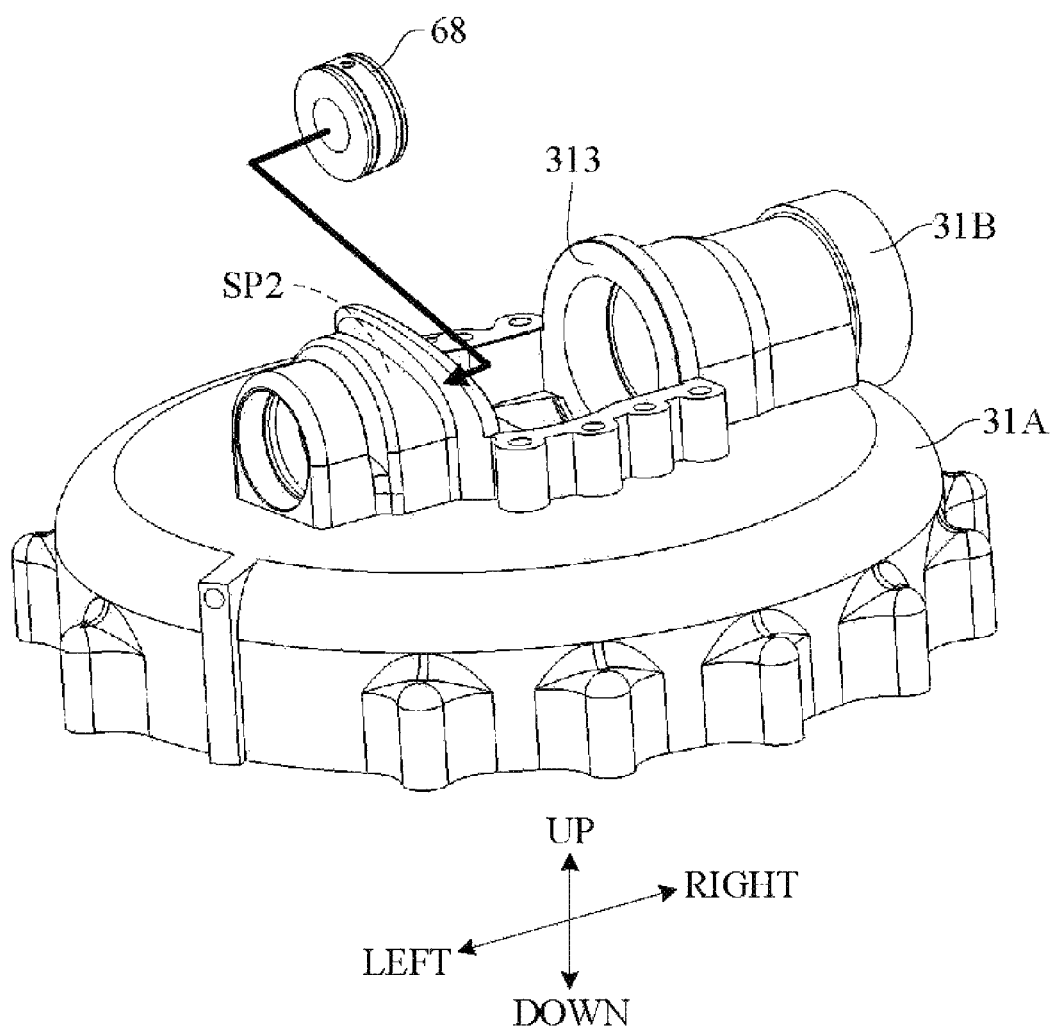
FIG. 7 is a perspective view showing a step following FIG. 6.

Next, as indicated by an arrow in FIG. 7, the oil guide 68 is inserted through the opening 313 into the second housing space SP2 leftward of the opening 313. The oil guide 68 is inserted with a seal ring fitted on its circumferential surface.

Figure 8:
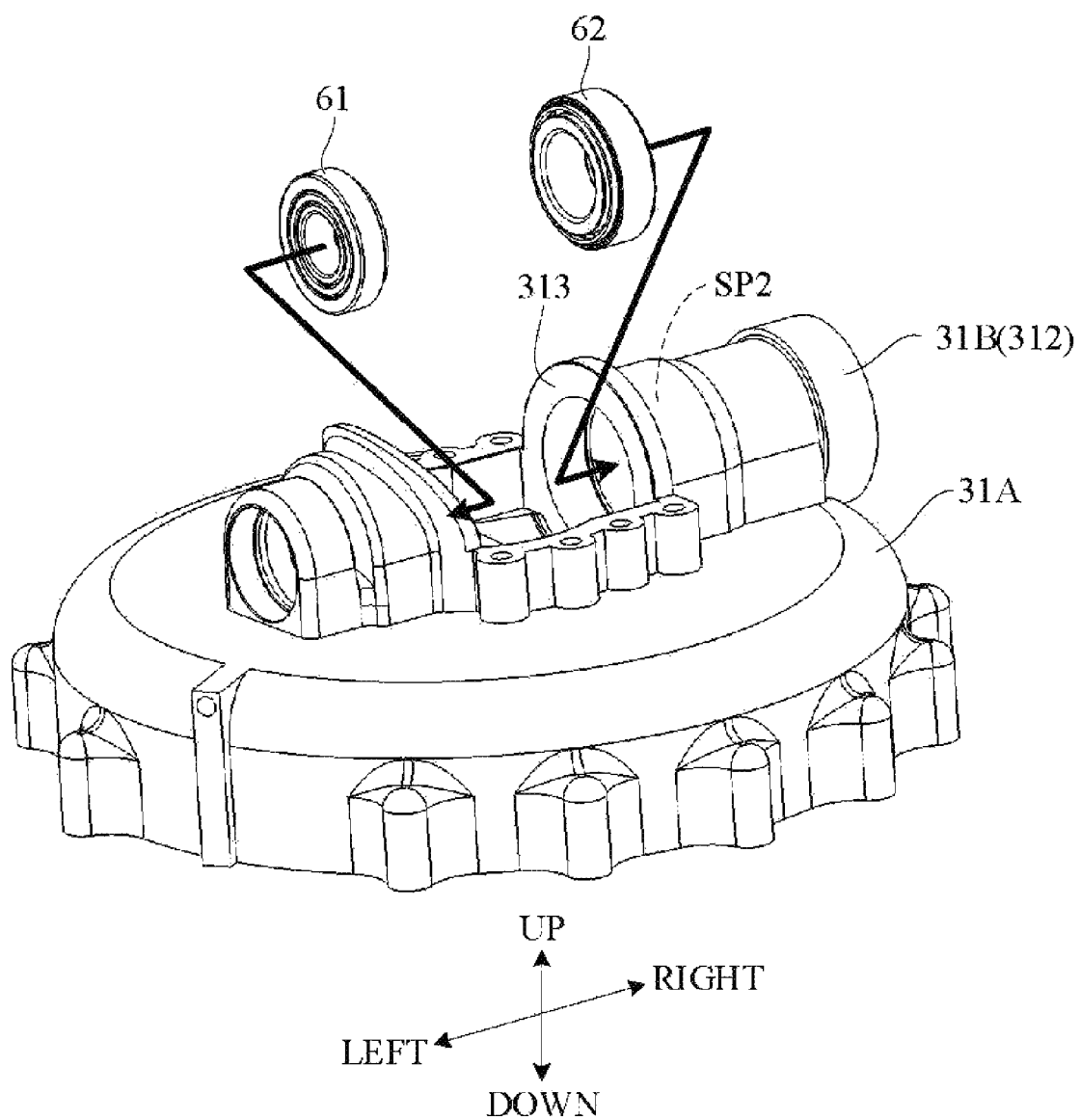
FIG. 8 is a perspective view showing a step following FIG. 7.

Next, as indicated by arrows in FIG. 8, the tapered roller bearings 61 and 62 are inserted through the opening 313 respectively into the second housing space SP2 leftward of the opening 313 and into the second housing space SP2 rightward of the opening 313. The tapered roller bearings 61 and 62 are fitted on inner peripheral surfaces of the substantially cylinder-shaped swelling portion 312.

Figure 9:
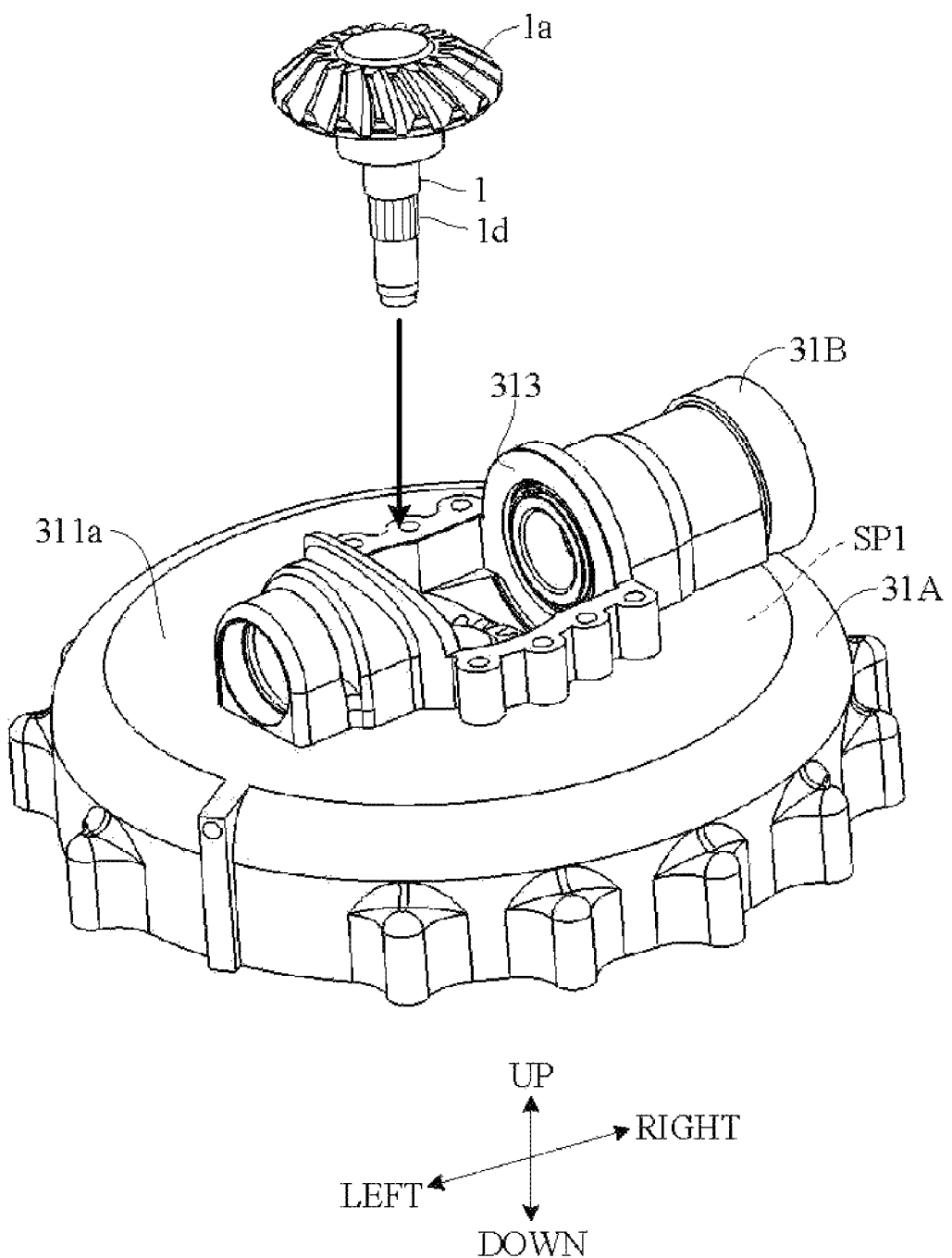
FIG. 9 is a perspective view showing a step following FIG. 8.

Next, as indicated by an arrow in FIG. 9, the first shaft 1 is inserted from above through the opening 313 into the first housing space SP1. At this time, the outer peripheral surface of the first shaft 1 is fitted on the inner peripheral surfaces of the tapered roller bearings 40 and 41 as shown in FIG. 2, and the outer peripheral surface splines of the first shaft 1 engage the inner peripheral surface splines of the shaft 55 of the planetary gear mechanism 50. Axial position of the first shaft 1 is thereafter restrained by fastening the nut 42 to the lower end portion of the first shaft 1. In this state, the top surface 1c of the first bevel gear 1a is located below the top surface 311a of the first upper case 31A (see FIG. 1).

Figure 10:
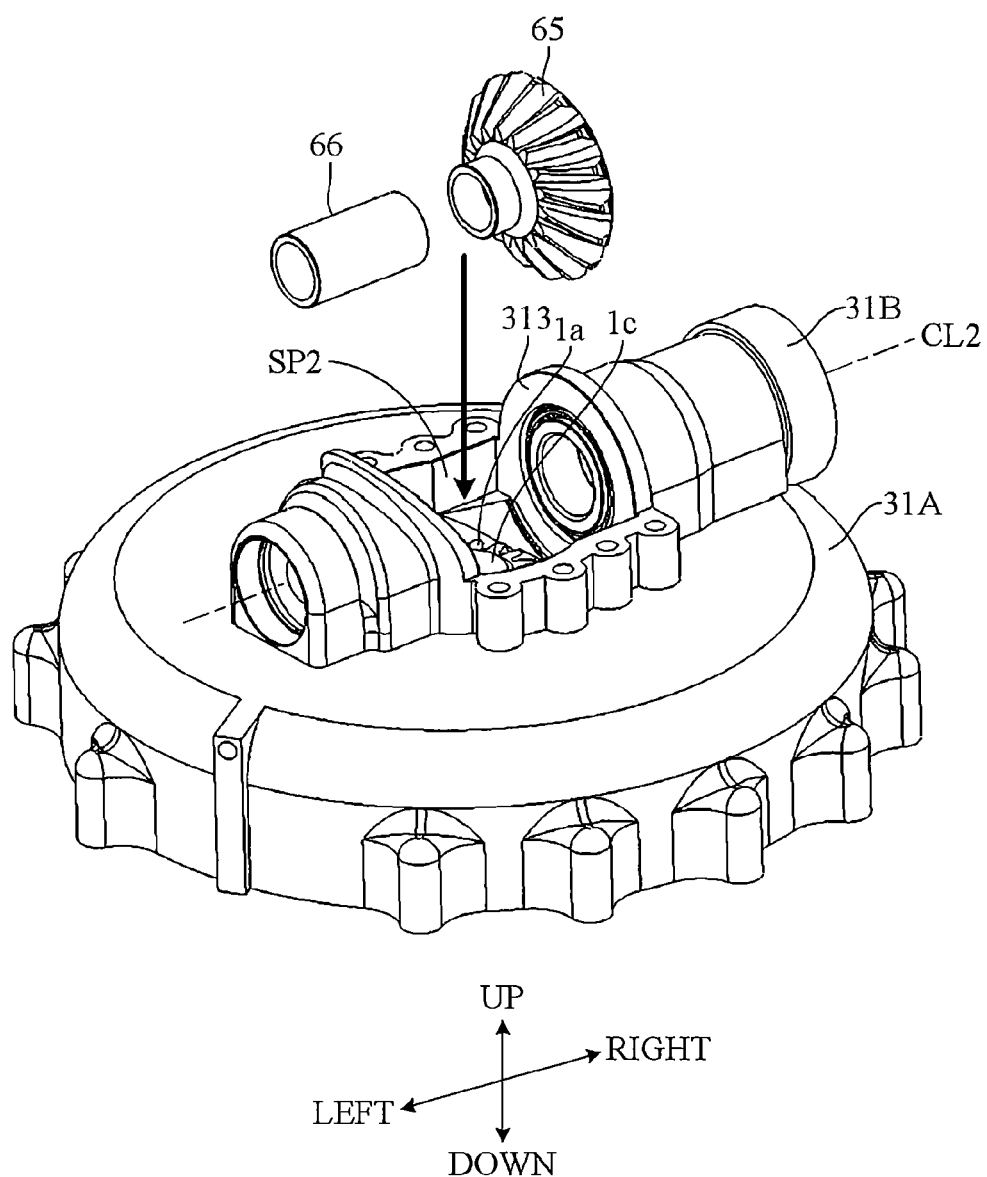
FIG. 10 is a perspective view showing a step following FIG. 9.

Next, as indicated by an arrow in FIG. 10, the spacer 66 is inserted from above through the opening 313 into the second housing space SP2, and the second bevel gear 65 is inserted so as to engage with the first bevel gear 1a. Although not illustrated in the drawings, a lower outer peripheral surface of the inserted spacer 66 is placed on a lower inner peripheral surface of the second upper case 31B or on the top surface 1c of the first bevel gear 1a. Therefore, in such a state, a central axis of the spacer 66 lies slightly below the axis CL2.

Figure 11:
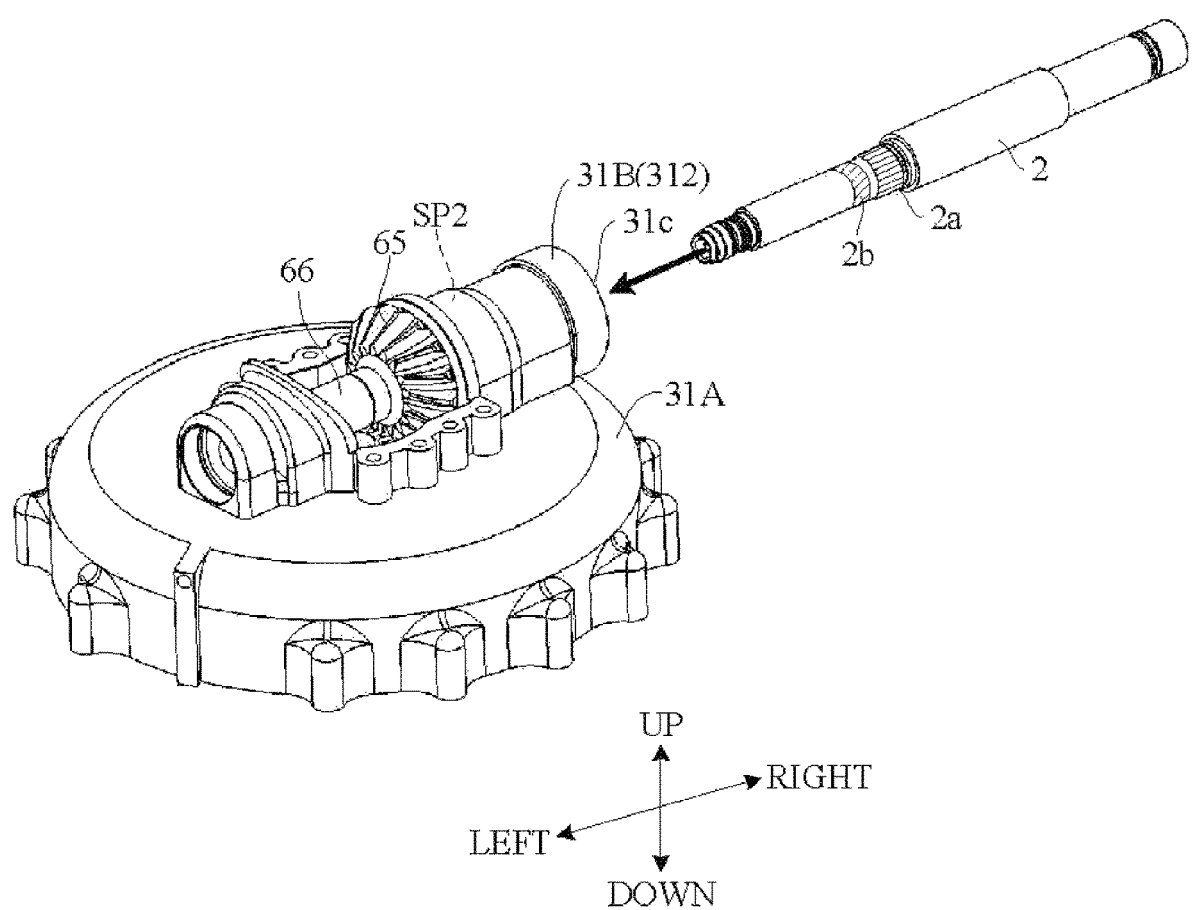
FIG. 11 is a perspective view showing a step following FIG. 10.

Next, as indicated by an arrow in FIG. 11, the second shaft 2 is inserted through the right end opening 31c of the second upper case 31B (swelling portion 312) into the second housing space SP2 from the right side. At this time, the second shaft 2 sequentially pass through the tapered roller bearing 62, second bevel gear 65, spacer 66, tapered roller bearing 61 and oil guide 68, until its left end portion comes to project leftward of the oil guide 68. As a result, the second bevel gear 65 and spacer 66 are held by the second shaft 2 in a state with their central axes coincident with the axis CL2. Should the second shaft 2 be hard to insert because, for example, offset of the central axis of the spacer 66 from the axis CL2 is large prior to insertion of the second shaft 2, the spacer 66 can be lifted up by hand during insertion of the second shaft 2.

Figure 12:
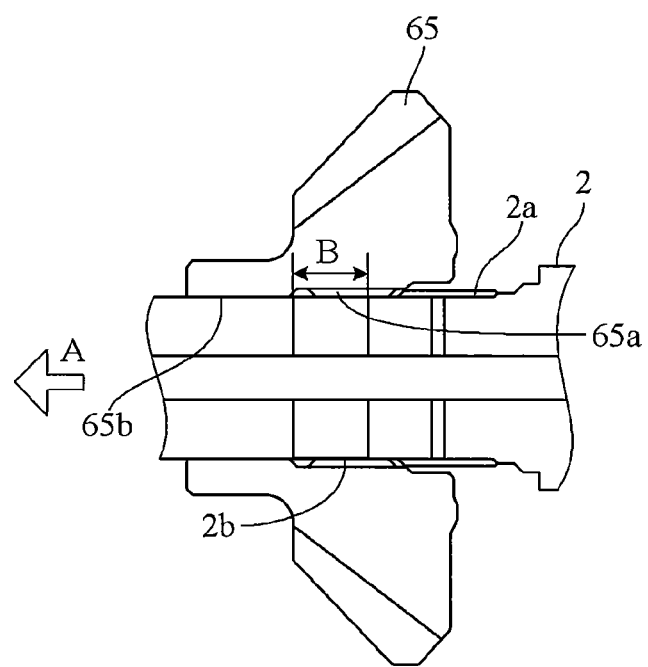
FIG. 12 is a cross-sectional diagram showing the step of FIG. 11.

FIG. 12 is a cross-sectional diagram showing relation of the second bevel gear 65 with respect to the second shaft 2 in the course of second shaft 2 insertion. As shown in FIG. 12, the inner peripheral surface of the second bevel gear 65 is provided with splines 65a and with a press-fit region 65b leftward of the splines 65a. When the second shaft 2 passes through the second bevel gear 65 as it moves in the direction of arrow A in FIG. 12, splines 2a on the outer peripheral surface of the second shaft 2 mesh with the splines 65a on the inner peripheral surface of the second bevel gear 65, and a press-fit region 2b of the outer peripheral surface of the second shaft 2 shown at region B fits (loosely fits) on the press-fit region 65b of the inner peripheral surface of the second bevel gear 65. After the splines 2a of the second shaft 2 mesh with the splines 65a of the second bevel gear 65 at this time, the press-fit region 2b presses (presses lightly) on the press-fit region 65b.

Figure 13:
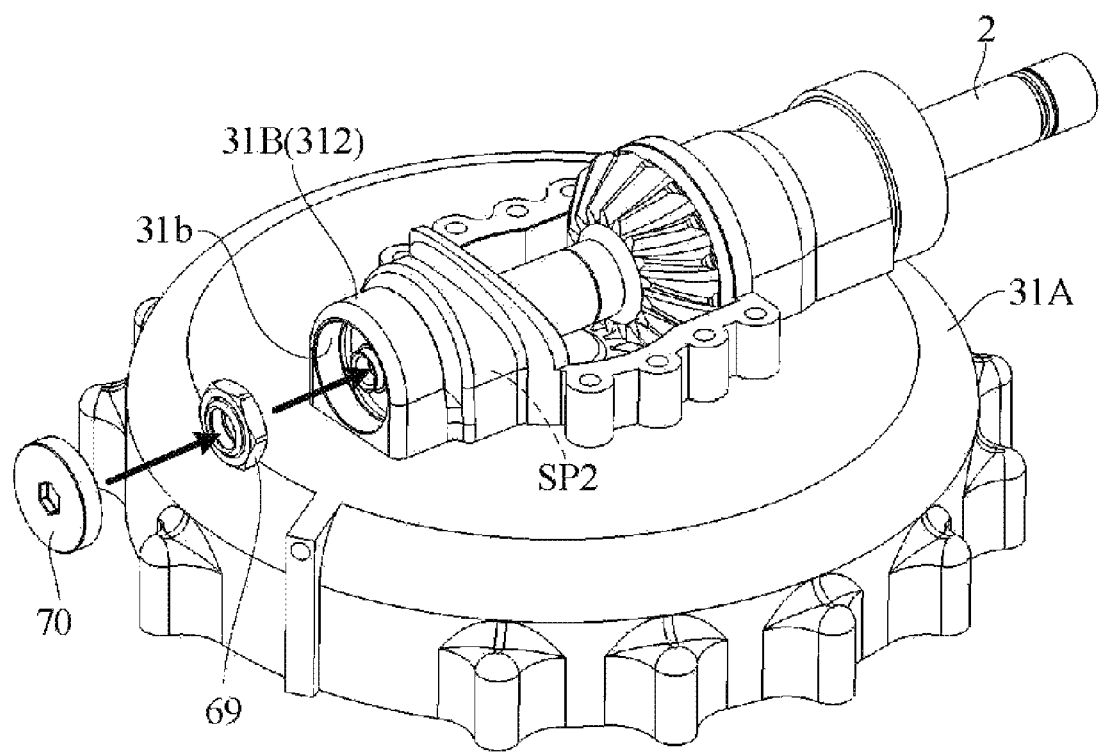
FIG. 13 is a perspective view showing a step following FIG. 11.
Figure 13:
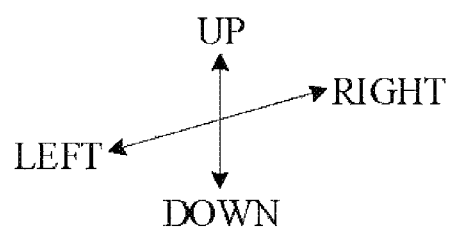

Next, as indicated by an arrow in FIG. 13, the nut 69 is inserted through the left end opening 31b of the second upper case 31B (swelling portion 312) into the second housing space SP2 from the left, and the nut 69 is fastened to the left end portion of the second shaft 2. This restrains axial position of the second shaft 2. The cap 70 is then attached to an inner peripheral surface of the opening 31b. The inner peripheral surface of the opening 31b and an outer peripheral surface of the cap 70 are formed with threaded portions, and the cap 70 is screwed into the opening 31b.

Figure 14:
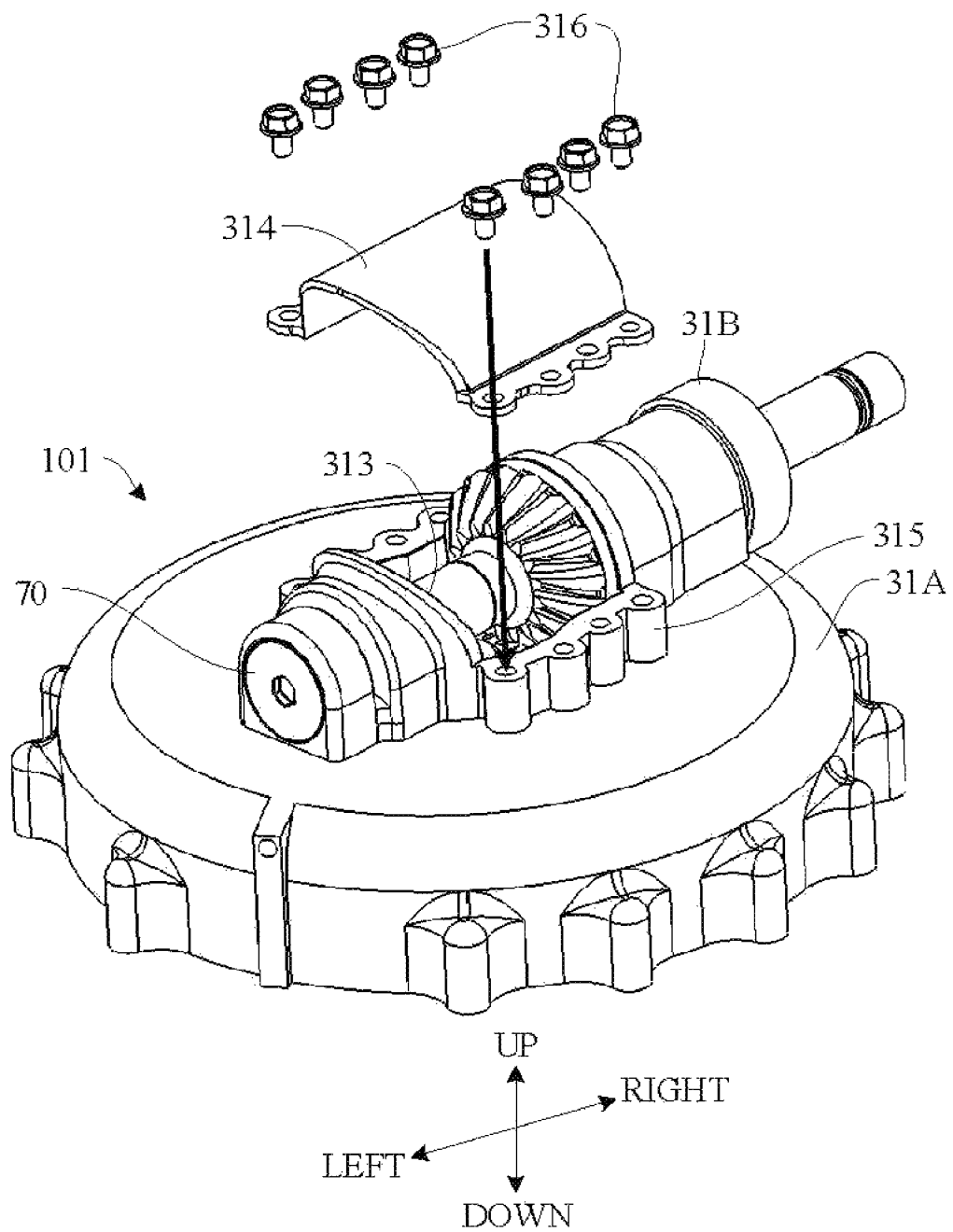
FIG. 14 is a perspective view showing a step following FIG. 13.

Finally, as indicated by an arrow in FIG. 14, the cover 314 is set in place to close the opening 313 of the upper surface of the second upper case 31B from above, whereafter the cover 314 is fastened to the mounting bases 315 of the second upper case 31B by the bolts 316. Manufacturing (assembly) of the first drive unit 101 is completed by the foregoing steps.

In the above manufacturing method, the first bevel gear 1a and the second bevel gear 65 are inserted through the opening 313 of the upper case 31 respectively into the first housing space SP1 and into the second housing space SP2 to be engaged with each other. As a result, the apparatus as a whole can be more compactly configured than in the case of first incorporating each of the pair of bevel gears into a separate case and thereafter engaging the bevel gears with each other by joining the separate cases together. This point is explained in the following with reference to an example for comparison with the present embodiment shown in FIG. 15.

Figure 15:
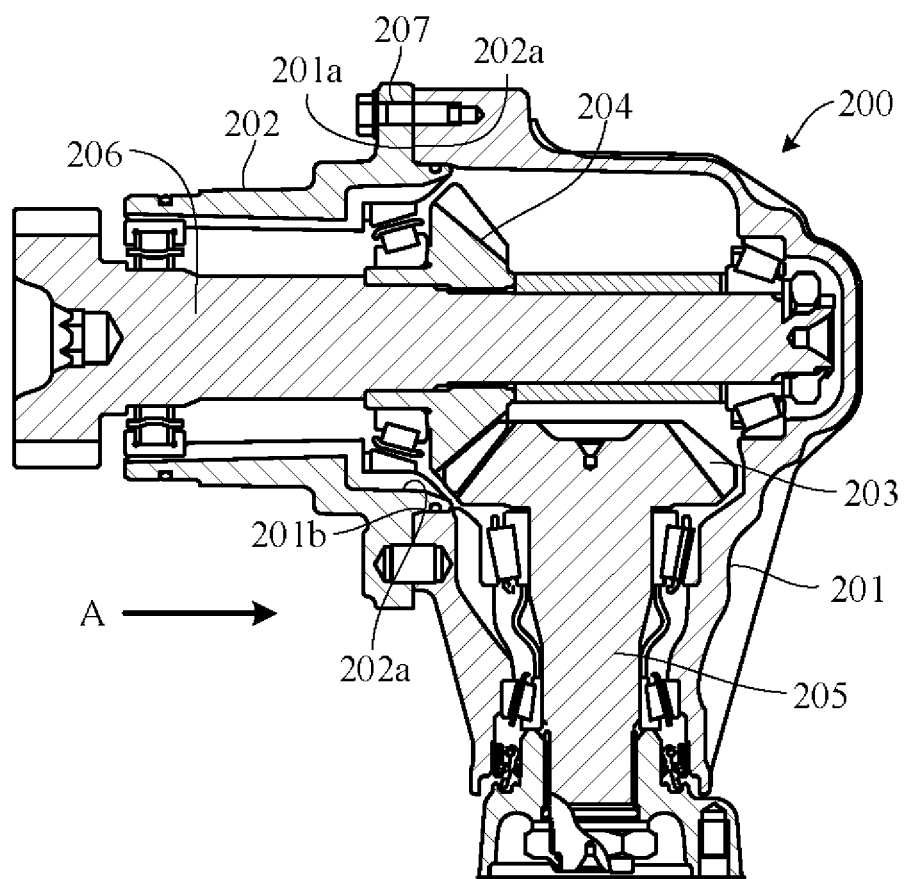
FIG. 15 a diagram showing a comparison example of the vehicle driving apparatus according to the embodiment of the invention.

In a unit 200 shown in FIG. 15, a first shaft 205 having a first bevel gear 203 and a second shaft 206 having a second bevel gear 204 are in advance respectively supported in a first case 201 and a second case 202. The second case 202 is then fitted onto the first case 201 as indicated by an arrow "A", whereafter a distal end face 202a of the second case 202 is attached to a side end face 201a of the first case 201 by bolts 207. This engages the bevel gears 203 and 204.

In such a manufacturing method, the first bevel gear 203 has to be exposed inward of an opening 201b of the first case 201 as viewed from the side of the opening 201b (arrow "A" direction). Therefore, since the first shaft 205 becomes long, compact configuration of the unit 200 is difficult. In contrast, in the present embodiment, the vehicle driving apparatus 100 is assembled by inserting the pair of bevel gears 1a and 65 through the opening 313 of the upper case 31. Therefore, the first shaft 1 need not project above the top surface 311a of the first upper case 31A, and the vehicle driving apparatus 100 can be compactly configured.

According to the embodiment, the following operations and effects can be achieved.

(1) The vehicle driving apparatus 100 includes: the motor MT having the rotor 10 rotatable about the vertical axis CL1 and the stator 20 located around the rotor 10 so as to surround the rotor 10; the first shaft 1 provided at a center portion of the rotor 10 to be integrally rotatable with the rotor 10 and having the first bevel gear 1a at its upper end portion projected from a top surface of the rotor 10; the second shaft 2 extending along the horizontal axis CL2; the second bevel gear 65 engaged with the first bevel gear 1a and having the inner peripheral surface (splines 65a, press-fit region 65b) fitted to the outer peripheral surface of the second shaft 2 to rotate integrally with the second shaft 2; and the case 30 including the upper case 31 (first upper case 31A) and lower case 32 forming the first housing space SP1 for accommodating the rotor 10, stator 20, first shaft 1 and first bevel gear 1a, and the upper case 31 (second upper case 31B) provided at an upper end portion of the first upper case 31A and forming the second housing space SP2 for accommodating the second shaft 2 and the second bevel gear 65 (FIGS. 1, 2, 12). The second upper case 31B has the opening 313 enabling insertion of the second bevel gear 65 at its upper surface and the cover 314 for closing the opening 313 (FIG. 5).

This adoption of a configuration whereby the second bevel gear 65 can be inserted through the opening 313 of the second upper case 31B in this manner enables the first bevel gear 1a to mate with the second bevel gear 65 without projecting from the top surface 311a of the first upper case 31A. Therefore, height of the vehicle driving apparatus 100 can be minimized. As a result, the vehicle driving apparatus 100 can easily be installed at about the same height level as the drive wheels, so that no thought need be given to raising the height of the vehicle hood or cabin floor immoderately. Since the first upper case 31A which forms the first housing space SP1 and the second upper case 31B which forms the second housing space SP2 unitarily constitute the upper case 31, the vehicle driving apparatus 100 is structurally simplified because no fastening members or the like for bolting the cases together are required.

(2) The first bevel gear 1a is accommodated in the first housing space SP1 so that its top surface 1c is positioned below the top surface 311a of the first upper case 31A (FIG. 1). Therefore, height of the vehicle driving apparatus 100 can be minimized.

(3) The first upper case 31A exhibits a substantially cylinder shape centered on the axis CL1, and the second upper case 31B exhibits a substantially cylinder or substantially semicylinder shape which swells from the top surface 311a of the first upper case 31A, is centered on the axis CL2 and is of smaller diameter than the first upper case 31A (FIG. 3). Therefore, since range of protrusion from the top surface 311a of first upper case 31A is minimized, extra space usable for installing other components becomes available upward of the first upper case 31A and both forward and rearward of the swelling portion 312.

(4) The top surface of the motor MT, whose role is to generate vehicle driving torque, is located below the axis CL3 connecting the rotation centers of the left and right vehicle drive wheels (front wheels 103) (FIG. 4A). As a result, the vehicle drive motor MT can be compactly installed in a vehicle with no loss of vehicle design performance or interior space performance.

(5) The manufacturing method of the vehicle driving apparatus 100 includes the steps of inserting the second bevel gear 65 through the opening 313 formed in the upper surface of the second upper case 31B so as to engage with the first bevel gear 1a accommodated in the first housing space SP1, inserting the second shaft 2 along the axis CL2 so as to fit to the inner peripheral surface (splines 65a, press-fit region 65b) of the second bevel gear 65, and closing the opening 313 with the cover 314 (FIGS. 5 to 14). Since this makes it possible to assemble the vehicle driving apparatus 100, not by joining cases 201 and 202 together as shown in FIG. 15, but by inserting the second bevel gear 65 through the opening 313, the vehicle driving apparatus 100 can be compactly configured.

Although in the above embodiment (FIG. 2) the vehicle driving apparatus 100 is mounted on the vehicle with the axis CL1 (a first axial line) of the motor MT oriented in up-down direction (vehicle height direction) and the axis CL2 (a second axial line) of the second shaft 2 oriented in left-right direction, the manner of mounting a vehicle driving apparatus on a vehicle is not limited to the above example, and the vehicle driving apparatus 100 can, for instance, be alternatively installed with the axis CL2 oriented in front-rear direction of the vehicle. In the above embodiment (FIG. 12), the inner peripheral surface of the second bevel gear 65 is configured by the splines 65a and the press-fit region 65b. However, an inner peripheral surface can be of any configuration insofar as capable of fitting to the second shaft so as to rotate integrally with the second shaft.

In the above embodiment (FIG. 2), the first housing space SP1 is formed by the first upper case 31A and lower case 32, and the second housing space SP2 is formed by the second upper case 31B. However, the configurations of a first case and a second case, i.e., the configuration of a case, is not limited to the aforesaid. In the above embodiment (FIG. 5), the opening 313 provided in the upper surface of the second upper case 31B for enabling insertion of the second bevel gear 65 is of substantially rectangular shape in plan view. However, the shape of an opening is not limited to the aforesaid. So the configuration of a cover for closing the opening is also not limited to the aforesaid. Although in the above embodiment (FIG. 1), the top surface 1c of the first bevel gear 1a is defined to be located below the top surface 311a of the first upper case 31A, the heights of the top surface 1c and the top surface 311a can instead be substantially the same.

Although in the above embodiment (FIG. 8), the left and right tapered roller bearings 61 and 62 are inserted through the opening 313 into the second housing space SP2 to be installed in the second upper case 31B by insertion, a pair of bearings installed inside a second case facing an opening is not limited to this configuration. Although in the above embodiment (FIG. 10), the spacer 66 along with the second bevel gear 65 is inserted through the opening 313 into the second housing space SP2 so as to be installed in the second upper case 31B. In other words, the spacer 66 is installed next to the second bevel gear 65 and between the pair of bearings 61 and 62. However, a spacer can be omitted.

A vehicle driving apparatus of the present invention can be used as a variety of type other than the above one. For example, it can be used in a transfer of four-wheel-drive vehicle.

The above embodiment can be combined as desired with one or more of the above modifications. The modifications can also be combined with one another.

According to the present invention, height of a vehicle driving apparatus installed in a state that a rotation axis of a dynamoelectric machine is oriented in vehicle height direction can be minimized.

Above, while the present invention has been described with reference to the preferred embodiments thereof, it will be understood, by those skilled in the art, that various changes and modifications may be made thereto without departing from the scope of the appended claims.

What is claimed is:

1. A vehicle driving apparatus for a vehicle having drive wheels, comprising:
   a dynamoelectric machine including a rotor rotatable about a first axial line in a vertical direction and a stator provided so as to surround the rotor;
   a first shaft provided at a center portion of the rotor to rotate integrally with the rotor and including a first bevel gear at an upper end portion of the first shaft projected from a top surface of the rotor;
   a second shaft extended along a second axial line in a horizontal direction;
   a second bevel gear engaged with the first bevel gear and including an inner peripheral surface fitted to an outer peripheral surface of the second shaft to rotate integrally with the second shaft; and
   a case including a first case to form a first housing space so as to accommodate the rotor, the stator, the first shaft and the first bevel gear and a second case to form a second housing space so as to accommodate the second shaft and the second bevel gear,
   wherein the second case is provided at an upper end portion of the first case, and includes an opening at an upper surface thereof through which the second bevel gear is inserted into the second housing space and a cover to close the opening,
   the first case is a substantially cylinder shape centered on the first axial line,
   the second case is a substantially cylinder or substantially semicylinder shape swollen from a top surface of the first case and centered on the second axial line,
   a diameter of the second case is smaller than a diameter of the first case,
   the opening is a semicylinder shape centered on the second axial line, and
   the cover is configured by a semicylinder-shaped plate corresponding to the opening.

2. The vehicle driving apparatus according to claim 1, wherein
   a top surface of the first case is positioned below the second axial line, and
   the first bevel gear is accommodated in the first housing space so that a top surface of the first bevel gear is positioned at a height equal to the top surface of the first case or below the top surface of the first case.

3. The vehicle driving apparatus according to claim 1, wherein
   the drive wheels include left and right drive wheels,
   the dynamoelectric machine is configured to generate a vehicle driving torque, and
   a top surface of the dynamoelectric machine is located below an axial line connecting rotation centers of the left and right drive wheels.

4. The vehicle driving apparatus according to claim 1, further comprising a pair of bearings installed in the second case, facing the opening so as to support rotatably the second shaft.

5. The vehicle driving apparatus according to claim 4, further comprising a spacer installed next to the second bevel gear and between the pair of bearings.

6. The vehicle driving apparatus according to claim 1, further comprising a nut fastened to a tip portion of the second shaft to restrict a position of the second shaft in an axial direction.

7. A manufacturing method of a vehicle driving apparatus that includes: a dynamoelectric machine including a rotor rotatable about a first axial line in a vertical direction and a stator provided so as to surround the rotor; a first shaft provided to rotate integrally with the rotor and including a first bevel gear at an upper end portion of the first shaft projected from a top surface of the rotor; a second shaft extended along a second axial line in a horizontal direction; a second bevel gear engaged with the first bevel gear and including an inner peripheral surface fitted to an outer peripheral surface of the second shaft to rotate integrally with the second shaft; and a case including a first case to form a first housing space so as to accommodate the rotor, the stator, the first shaft and the first bevel gear and a second case to form a second housing space so as to accommodate the second shaft and the second bevel gear, wherein the second case is provided at an upper end portion of the first case and includes an opening at an upper surface thereof through which the second bevel gear is inserted into the second housing space and a cover to close the opening, the first case is a substantially cylinder shape centered on the first axial line, the second case is a substantially cylinder or substantially semicylinder shape swollen from an a top surface of the first case and centered on the second axial line, a diameter of the second case is smaller than a diameter of the first case, the opening is a semicylinder shape centered on the second axial line, and the cover is configured by a semicylinder-shaped plate corresponding to the opening,
   the manufacturing method comprising:
   inserting the second bevel gear into the second housing space through the opening at the upper surface of the second case so as to engage with the first bevel gear accommodated in the first housing space;
   inserting the second shaft along the second axial line into the second housing space so as to fit within an inner peripheral surface of the second bevel gear; and
   closing the opening with the cover.

8. The vehicle driving apparatus according to claim 1, wherein
   the opening is provided at a position intersecting with the first axial line so that the first bevel gear is inserted into the first case through the opening along the first axial line.

9. The vehicle driving apparatus according to claim 4, wherein
   the second case is formed so as to be divided into a first portion and a second portion along the second axial line on both sides of the opening, and
   the pair of bearings are disposed in the first portion and the second portion.

10. The vehicle driving apparatus according to claim 8, wherein
   the first portion and the second portion are provided with through holes so that the second shaft passes through the first portion and the second portion along the second axial line.

* * * * *